April 21, 1936. V. E. CARBONARA 2,037,698
VIBRATION RECORDING INSTRUMENT
Filed May 4, 1932 2 Sheets-Sheet 1
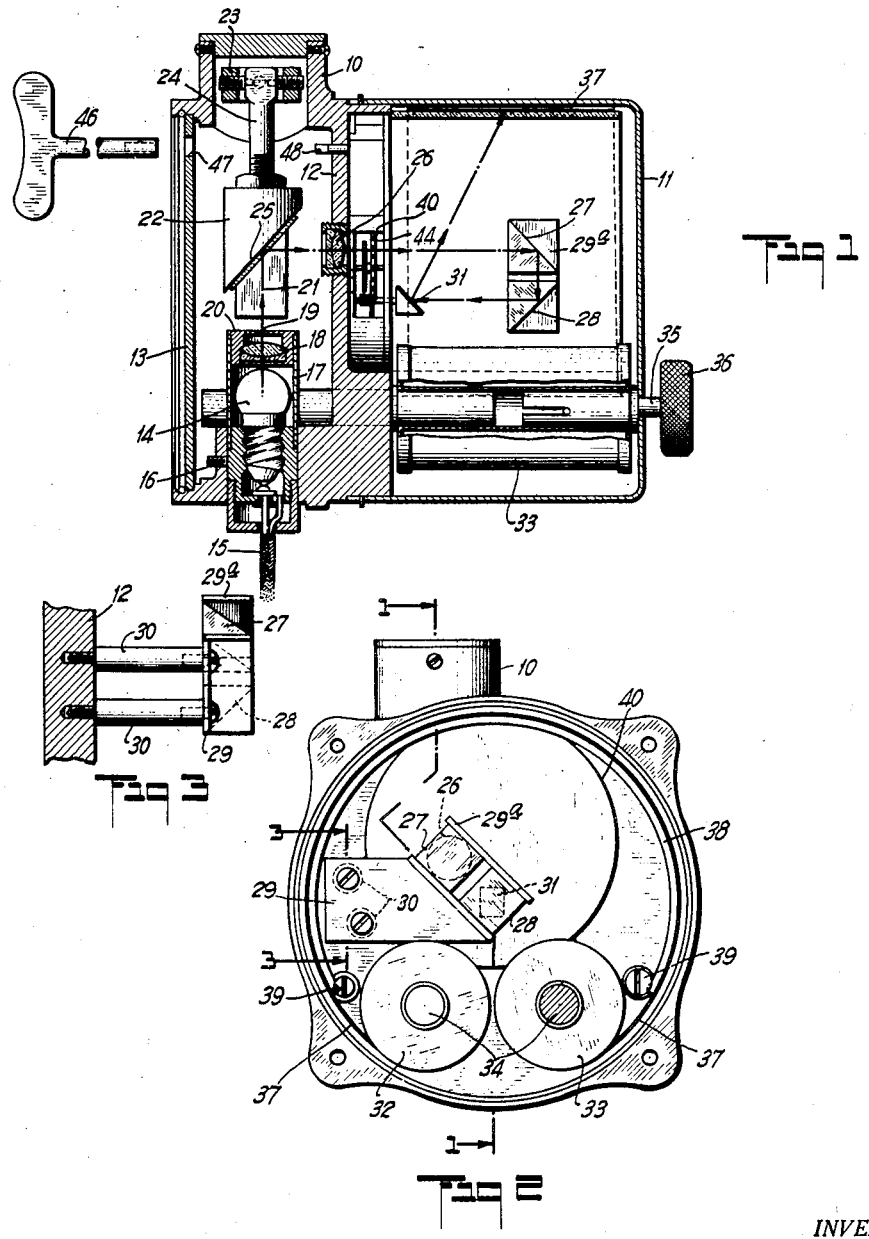
INVENTOR.
VICTOR E. CARBONARA.
BY Stephen Cerstvik.
ATTORNEY.

April 21, 1936.  V. E. CARBONARA  2,037,698
VIBRATION RECORDING INSTRUMENT
Filed May 4, 1932  2 Sheets-Sheet 2
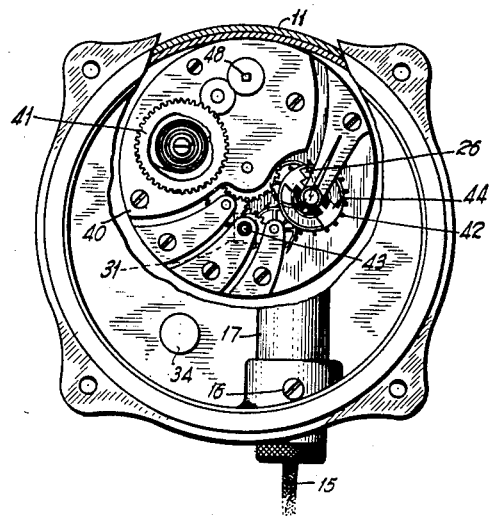
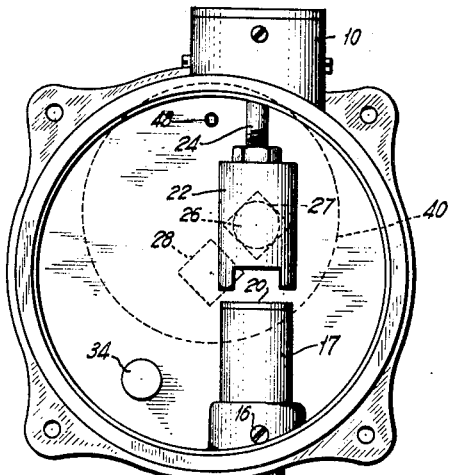
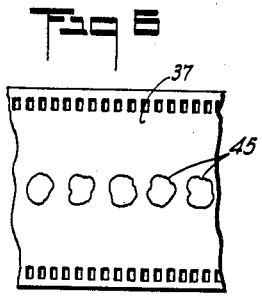
INVENTOR.
VICTOR E. CARBONARA.
BY
Stephen Gerstvik
ATTORNEY.

Patented Apr. 21, 1936

2,037,698

UNITED STATES PATENT OFFICE 2,037,698

VIBRATION RECORDING INSTRUMENT

Victor E. Carbonara, Rockville Centre, N. Y., assignor to Bendix Aviation Corporation, South Bend, Ind., a corporation of Delaware Application May 4, 1932, Serial No. 609,237

7 Claims. (Cl. 234—5.6)

This invention relates to recording instruments, and more particularly to means for recording vibrations.

Although, in its broadest aspect, the invention is adapted for recording vibrations of any mechanical structures, it is particularly suitable for recording vibrations on aircraft, and more specifically, vibrations of instrument panels on aircraft.

Vibration of a mechanical structure produces undesirable conditions therein such, for example, as fatigue of elements of the structure. Furthermore, excessive vibrations of an aircraft instrument panel leads to premature deterioration and/or to erroneous indications of the various sensitive instruments mounted on the panel. In order to overcome such conditions, it is highly desirable to accurately measure the amplitude and form of the vibrations to which the structure is subjected. Accordingly, one of the objects of the present invention is to provide a novel instrument which may be readily installed on a vibrating structure for recording the vibrations of the latter, and more particularly the amplitude and form of such vibrations.

Another object of the invention is to provide a novel vibration recording instrument which is particularly adapted for use in determining the nature of vibrations of a movable structure such, for example, as an airplane.

Another object is to provide a vibration recording instrument, or vibrograph, of such size, shape and weight that the same may be readily mounted on a vibratable member without substantially altering the vibration characteristics of said member.

Another object is to provide a novel vibration recording instrument of such size, shape and weight that the same may be readily mounted on an instrument panel such, for example, as an aircraft instrument panel, in any of the openings provided for standard instruments, without substantially altering the vibration characteristics of the panel so that the exact characteristics of the vibrations of the panel to which the instrument is subjected in operation may be quickly and accurately determined and permanently recorded.

A further object is to provide a novel device of the above character which is so constructed as to make a permanent, visual record of the amplitude, in two planes, and of the form of the vibrations of the member on which the device is mounted.

A still further object is to provide a novel vibration recording instrument of the photographic type which is of small size and light weight.

The above and other objects and advantages will appear more fully hereinafter from a consideration of the detailed description of one embodiment of the invention, which latter is illustrated in the accompanying drawings. It is to be expressly understood, however, that the drawings are for the purpose of illustration only and are not designed as a definition of the limits of the invention, reference being had, primarily, to the appended claims for this purpose.

In the drawings wherein like reference characters refer to like parts throughout the several views:

Fig. 1 is a longitudinal section illustrating an instrument embodying the present invention;

Fig. 2 is a rear end view of the device shown in Fig. 1 after a portion of the cover or housing has been removed;

Fig. 3 is an enlarged detail view taken along line 3—3 of Fig. 2;

Fig. 4 is an end elevation, partly in section and with parts broken away, illustrating one form of watch mechanism which may be employed in carrying out the invention;

Fig. 5 is a front end elevation of the instrument shown in Fig. 1; and

Fig. 6 is a detail view illustrating the type of vibration record which may be obtained by the use of the present invention.

In the form shown, the novel vibrograph, or vibration recording instrument, comprises a housing 10 to the rear of which is detachably secured a metal cup 11, the members 10, 11, constituting the instrument case. Housing 10 embodies a wall 12 constituting a partition which divides the instrument case into rear and front compartments, the latter being closed by the disc 13 secured in any suitable manner to the front end of housing 10. The case is adapted to be mounted on a vibrating member and, accordingly, when so mounted it is subjected to the vibrations of said member. As illustrated, the case or housing 10 is of such size and form as to be readily mounted on an instrument panel such, for example, as an aircraft instrument panel, in any of the openings provided thereon for mounting standard aircraft instruments. It is to be expressly understood, however, that the invention is not limited to the form illustrated, but may be made for suitable mounting on any type of vibrating structure.

Means are provided within casing 10, 11, to project a beam of light and, since said means are mounted within the casing, the light beam will be subjected to the vibrations of the member on which the casing is mounted. For this purpose, there is employed a lamp 14, such as a focusing-type flash light bulb, that is connected by means of leads 15 to a suitable source of current such as a battery (not shown). The lamp is mounted in any convenient manner in the lower portion of housing 10 and in the front compartment substantially intermediate walls 12 and 13. The lamp socket 16 has secured thereto, in a position to surround lamp 14, an opaque sleeve 17 which extends upwardly and carries adjacent its upper end a condenser lens 18 which directs the light beam through a small aperture 19 in the disc-like member 20 secured to the upper end of sleeve 17.

As noted above, the casing 10, 11 and lamp 14, and hence the light beam illustrated by the irregular line 21, are all subjected to the vibrations of the member on which said casing is mounted. A reference member having a motion which is independent of the vibration frequencies, i. e., which is stationary with respect to the axes of the member whose vibration charasteristics are to be recorded, is provided, however, in order that the movements of the light beam, and hence the amplitude and form of vibrations to which said beam is subjected, may be recorded. The reference member will be referred to as being a stationary member since it has no movement in a horizontal plane passing through the center of mass of said member, although said plane moves in unison with the vertical component of the vibrations and hence in unison with a parallel plane passing through the source of light. It is thus possible to obtain a faithful record of the vibrations in two planes, and such records can be compared with an arbitrary standard to secure the desired results.

In order to provide said stationary reference member, the present instrument preferably is fitted with a pendulum 22 having a natural frequency such that it is substantially independent of the frequencies of vibrations imparted to the instrument case. The pendulum is mounted by means of a jeweled bearing, universal joint 23 attached in any suitable manner to the upper portion of housing 10. In order that pendulum 22 and the pendulum rod 24 may be independent of vibration frequencies, they should be so formed as to have a natural frequency of substantially one-fifth or less of the lowest frequency which it is desired to record. For example, if the instrument is employed on an airplane instrument board, the frequency of the pendulum should be one-fifth or less of the lowest frequency of the instrument board. It has been found that if the natural period of the pendulum is less than five times the period of the vibrations, the amplitudes of which are to be measured, the pendulum will not remain stationary in a horizontal plane and the resultant record will be an apparent rather than a true measure of the vibrations.

Preferably, pendulum rod 24 is so mounted within housing 10 that its longitudinal axis is coaxial with aperture 19 and the light beam 21 when the instrument is not being subjected to vibrations.

As noted above, there is never any relative movement between the pendulum, the light beam and aperture 19 along a vertical axis passing through these members, regardless of the vibrations imparted to the instrument. Lamp 14 and beam 21, however, each have relative movement with respect to pendulum 22 in a horizontal plane disposed substantially at right angles to the vertical line passing through the center of gravity of the pendulum.

Preferably, pendulum 22 is provided on its lower surface with an angularly disposed mirror or other reflecting member 25 for directing the vibrated beam 21 into the rear compartment of the instrument case. As shown, mirror 25 is disposed at an angle of substantially 45 degrees relative to the axis of rod 24 and the beam 21. Mounted in wall 12 of housing 10 is an objective lens 26 through which the light beam, reflected from mirror 25, passes into the rear compartment of the instrument case.

It is desirable to provide a vibration record of such size as to render the same readily readable, and at the same time provide an instrument of small size. Accordingly, the present invention, when adapted for use on airplanes, for example, preferably includes a plurality of light reflecting members to increase the optical leverage of the vibrated beam without increasing the overall length of the instrument. To this end, there are employed a pair of stationary prisms 27 and 28 mounted at an angle of substantially 45 degrees to the horizontal on an angle bracket 29 that is suitably attached to a pair of posts 30 which are secured to and extend laterally from the wall 12. A spacing plate 29a may be attached to the prisms if desired. As will be noted in Fig. 1, prisms 27, 28 reflect the light beam through 180 degrees onto a movable mirror 31 to be more fully described hereinafter.

Means are provided for positioning a light-sensitive member or film in the path of the light beam after it leaves the mirror 31 in order that a permanent record may be made of the amplitude and form of the vibrations to be measured. For this purpose, there are provided a pair of film-carrying spools 32 and 33 which may be mounted on suitable posts 34 in the rear compartment of the instrument case, the posts 34 projecting horizontally from the lower portion of wall 12.

A shaft 35, which projects through a suitable opening in cup 11 and is provided on its outer end with a knob 36, may be employed for rotating spool 33 to expose lengths of the film 37 to the light beam. The film is supported in operative position by means of a glass cylinder 38 which is supported in the rear compartment of the instrument case by means of a pair of screws 39, the heads of which may lap over the ends of the cylinder to hold the same in place. As will be noted in Fig. 2, a portion of the cylinder may be cut away so that its periphery subtends an angle of approximately 220 degrees. The film is thus supported on the outer surface of the glass cylinder intermediate said cylinder and the inner wall of cup 11 and in the path of the light beam 21 after the latter has been reflected by mirror 31. As a section of film is exposed, knob 36 may be rotated to bring another section of film into a position such that it is in the path of the reflected light beam 21.

If the mirror 31 and film are relatively stationary, a plurality of superimposed exposures of the film will be obtained. Since some difficulty might be experienced in reading such a record, the present invention comprehends the use of a mirror and film which are relatively movable. Additionally, it is desirable to provide an instrument of small weight in order that the same may be mounted on a vibrating member without substantially altering the mass of the member and hence the vibration characteristics thereof. If it is desired to move the film, a relatively large amount of power would be required and hence the weight of the instrument would be materially increased. Preferably, the present invention includes the use of a normally stationary film, and means are provided for angularly moving mirror 31 in order that a series of laterally spaced exposures may be obtained. To this end, the instrument includes an ordinary watch mechanism 40 comprising a main spring 41 (Fig. 4), a balance wheel 42 and the usual second-hand shaft 43. Mirror 31 is secured to the second-hand shaft 43 and is rotatable thereby. The balance wheel 42 is provided with a suitable shutter 44, which shutter is movable in a plane such that it interrupts the beam of light in its passage from the objective lens 26 to the prism 27.

It will be apparent that when the watch mechanism is in operation, mirror 31 will be moved and, at the instant that said mirror is moved, shutter 44 will interrupt the passage of light from lens 26 to prism 27. Accordingly, the beam will not strike or sensitize the film at the instant that the mirror is being moved, but immediately after the mirror has been shifted to a new angular position, the beam will again strike the film, whereby a series of separate exposures 45 (Fig. 6), picturing the amplitude and form of the vibrations to which the instrument case is subjected, will be obtained on the film. The watch mechanism may be wound by means of a key 46 (Fig. 1) adapted to be inserted through an opening 47 in the disc 13, and to engage a winding stem 48 constituting a portion of the watch mechanism. As shown, stem 48 projects through wall 12.

When lamp 14 is illuminated and the watch mechanism is in operation, vibrations imparted to the instrument case will be recorded on the film. After a section of film has been exposed, the circuit to the lamp may be opened and a new section of film moved into operative position by means of knob 36. Before the instrument is placed in use, it should be properly calibrated by determining the amplification constants for the two axes along which the amplitudes are measured. Any member which follows a simple harmonic motion of known amplitude, and to which the instrument can be conveniently attached, may be used as a standard. The constants may be readily obtained from a series of records taken with the instrument so mounted.

As will be seen by those skilled in the art, the instrument is not limited to use on instrument boards of airplanes but is adapted for a variety of uses where it is desired to determine the vibration characteristics of a particular member. Various changes may be made in the arrangement and design of the parts. For example, if the vibrograph is not employed on airplanes, means may be utilized for moving the film with respect to the mirror which may be stationarily mounted in this event. Moreover, a record may be obtained even though neither the film nor the mirror is moved during the time that the film is being exposed. Preferably, however, the mirror is rotated since a very small amount of power only is required for this purpose. Furthermore, it is to be expressly understood that the stationary member may assume a variety of mechanical forms such, for example, as a heavy mass yieldingly mounted for freedom of movement in one or more planes, it being understood that said mass should have a frequency of substantially one-fifth or less of the frequency of the member whose vibration characteristics are to be determined. Obviously, various arrangements of prisms and mirrors may be employed. Accordingly, reference will be had, primarily, to the appended claims for a definition of the limits of the invention.

What is claimed is:

1. In a vibration recording instrument of the type including a casing having a mass mounted for universal relative movement therein, a reflecting member carried by said mass, light-projecting means secured in said casing for projecting a beam of light onto said reflecting member whereby said beam is vibrated by relative movement between said member and said casing when the latter is mounted on a member the vibrations of which are to be recorded, and additional reflecting means secured in said casing for further reflecting said beam, the combination of a rotatable reflecting member interposed between the reflecting member carried by the mass and the reflecting means secured in the casing, means for rotating said rotatable reflecting member whereby said vibrating beam is further reflected and has an angular movement imparted thereto, and a relatively stationary light-sensitive film in said casing for receiving said angularly movable vibrating beam thereon whereby a photographic record of the vibrations of the vibrating member is produced.

2. In a vibration recording instrument of the type including a casing having a mass mounted for universal movement therein, a reflecting member carried by said mass, light-projecting means secured in said casing for projecting a beam of light onto said reflecting member whereby said beam is vibrated by relative movement between said member and said casing when the latter is mounted on a member the vibrations of which are to be recorded, and additional reflecting means secured in said casing for further reflecting said beam, the combination of a rotatable reflecting member interposed between the reflecting member carried by the mass and the reflecting means secured in the casing, a timing mechanism in said casing for rotating said rotatable reflecting member whereby said vibrating beam is further reflected and has an angular movement imparted thereto, and a relatively stationary light-sensitive film in said casing for receiving said angularly movable vibrating beam thereon whereby a photographic record of the vibrations of the vibrating member is produced.

3. In a vibration recording instrument of the type including a casing having a mass mounted for universal relative movement therein, a reflecting member carried by said mass, light-projecting means secured in said casing for projecting a beam of light onto said reflecting member whereby said beam is vibrated by relative movement between said member and said casing when the latter is mounted on a member the vibrations of which are to be recorded, and additional reflecting means secured in said casing for further reflecting said beam, the combination of a rotatable reflecting member interposed between the reflecting member carried by the mass and the reflecting means secured in the casing, a spring actuated clock mechanism in said casing for rotating said rotatable reflecting member, whereby said vibrating beam is further reflected and has an angular movement imparted thereto, and a relatively stationary light-sensitive film in said casing for receiving said angularly movable vibrating beam thereon whereby a photographic record of the vibrations of the vibrating member is produced.

4. In a vibration recording instrument of the type including a casing having a mass mounted for universal relative movement therein, a reflecting member carried by said mass, light-projecting means secured in said casing for projecting a beam of light onto said reflecting member whereby said beam is vibrated by relative movement between said member and said casing when the latter is mounted on a member the vibrations of which are to be recorded, and additional reflecting means secured in said casing for further reflecting said beam, the combination of a rotatable reflecting member interposed between the reflecting member carried by the mass and the reflecting means secured in the casing, means for rotating said rotatable member whereby said vibrating beam is further reflected and has an angular movement imparted thereto, a relatively stationary light-sensitive film in said casing for receiving said angularly movable vibrating beam thereon whereby a photographic record of the vibrations of the vibrating member is produced, and a shutter for intermittently cutting off the passage of the light beam to said rotatable reflecting member as the latter rotates whereby a series of separate exposures picturing the amplitude and form of the vibrations is produced on the relatively stationary film.

5. In a vibration recording instrument of the type including a casing having a mass mounted for universal movement therein, a reflecting member carried by said mass, light-projecting means secured in said casing for projecting a beam of light onto said reflecting member whereby said beam is vibrated by relative movement between said member and said casing when the latter is mounted on a member the vibrations of which are to be recorded, and additional reflecting means secured in said casing for further reflecting said beam, the combination of a rotatable reflecting member interposed between the reflecting member carried by the mass and the reflecting means secured in the casing, a timing mechanism in said casing for rotating said rotatable reflecting member whereby said vibrating beam is further reflected and has an angular movement imparted thereto, a relatively stationary light-sensitive film in said casing for receiving said angularly movable vibrating beam thereon whereby a photographic record of the vibrations of the vibrating member is produced, and a shutter for intermittently cutting off the passage of the light beam to said rotatable reflecting member as the latter rotates whereby a series of separate exposures picturing the amplitude and form of the vibrations is produced on the relatively stationary film.

6. In a vibration recording instrument of the type including a casing having a mass mounted for universal relative movement therein, a reflecting member carried by said mass, light-projecting means secured in said casing for projecting a beam of light onto said reflecting member whereby said beam is vibrated by relative movement between said member and said casing when the latter is mounted on a member the vibrations of which are to be recorded, and additional reflecting means secured in said casing for further reflecting said beam, the combination of a rotatable reflecting member interposed between the reflecting member carried by the mass and the reflecting means secured in the casing, a spring actuated clock mechanism in said casing for rotating said rotatable reflecting member whereby said vibrating beam is further reflected and has an angular movement imparted thereto, a relatively stationary light-sensitive film in said casing for receiving said angularly movable vibrating beam thereon whereby a photographic record of the vibrations of the vibrating member is produced, and a shutter operated by said clock mechanism for intermittently cutting off the passage of the light beam to said rotatable reflecting member as the latter rotates whereby a series of separate exposures picturing the amplitude and form of the vibrations is produced on the relatively stationary film.

7. In a vibration recording instrument of the type including a cylindrical casing having a mass mounted for universal relative movement therein, a reflecting member carried by said mass, light-projecting means secured in said casing for projecting a beam of light onto said reflecting member whereby said beam is vibrated by relative movement between said member and said casing when the latter is mounted on a member the vibrations of which are to be recorded, and additional reflecting means secured in said casing for further reflecting said beam, the combination of a rotatable reflecting member interposed between the reflecting member carried by the mass and the reflecting means secured in the casing, means for rotating said rotatable member about an axis extending longitudinally of the cylindrical casing whereby said vibrating beam is further reflected and has an angular movement imparted thereto, and a relatively stationary longitudinal light-sensitive film in said casing and positioned transversely of said longitudinal ax's for receiving said angularly movable vibrating beam thereon whereby a photographic record of the vibrations of the vibrating member is produced.

VICTOR E. CARBONARA.